United States Patent
Hwang et al.

(10) Patent No.: US 8,493,349 B2
(45) Date of Patent: Jul. 23, 2013

(54) TOUCH SCREEN PANEL (75) Inventors: Sangsoo Hwang, Seoul (KR); Gangseob Jung, Seoul (KR); Junghyun Lee, Seoul (KR); Sejong Yoo, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 519 days.

(21) Appl. No.: 12/774,182

(22) Filed: May 5, 2010

(65) Prior Publication Data
US 2011/0141037 A1 Jun. 16, 2011

(30) Foreign Application Priority Data

Dec. 10, 2009 (KR) .......................... 10-2009-0122491
Mar. 25, 2010 (KR) .......................... 10-2010-0026549

(51) Int. Cl.
*G06F 3/041* (2006.01)
(52) U.S. Cl.
USPC .......................................................... 345/173
(58) Field of Classification Search
USPC ................................................. 345/173–174
See application file for complete search history.

(56) References Cited

U.S. PATENT DOCUMENTS

| 6,054,979 | A | 4/2000 | Sellers |
| 8,289,457 | B2 * | 10/2012 | Hwang et al. .................... 349/12 |
| 2005/0030048 | A1 | 2/2005 | Bolender et al. |
| 2007/0240914 | A1 * | 10/2007 | Lai et al. ..................... 178/18.06 |
| 2008/0264699 | A1 | 10/2008 | Chang et al. |
| 2009/0085885 | A1 | 4/2009 | Wu et al. |
| 2009/0160682 | A1 | 6/2009 | Bolender et al. |
| 2009/0160824 | A1 | 6/2009 | Chih-Yung et al. |
| 2010/0123674 | A1 * | 5/2010 | Wu et al. ....................... 345/173 |
| 2010/0220075 | A1 * | 9/2010 | Kuo et al. ..................... 345/174 |
| 2010/0283757 | A1 * | 11/2010 | Wu et al. ....................... 345/174 |
| 2011/0134055 | A1 * | 6/2011 | Jung et al. ..................... 345/173 |

FOREIGN PATENT DOCUMENTS

EP  2 112 574 A1  10/2009

* cited by examiner

*Primary Examiner* — Quan-Zhen Wang
*Assistant Examiner* — Tony Davis
(74) *Attorney, Agent, or Firm* — Birch, Stewart, Kolasch & Birch, LLP

(57) ABSTRACT

A touch screen panel to provide a type touch screen panel that can prevent or reduce a damage of the touch screen panel caused by electrostatic electricity, includes a plurality of first electrode patterns which are separated from each other, and connected by at least one of a plurality of first connection patterns that includes a first portion exposed through at least two first contact holes and a second portion exposed through at least two second contact holes.

19 Claims, 6 Drawing Sheets

TOUCH SCREEN PANEL

This application claims the priority and the benefit of Korea Patent Application Nos. 10-2009-122491 and 10-2010-0026549 filed on Dec. 10, 2009 and Mar. 25, 2010, respectively, the entire contents of which is incorporated herein by reference for all purposes as if fully set forth herein.

BACKGROUND OF THE INVENTION

1. Field of the Invention

Embodiments of the invention relates to a capacitive type touch screen panel.

2. Discussion of the Related Art

Along with the development of electronics industry, a display device such as a liquid crystal display, an electroluminescent display, and a plasma display panel having a quick response speed, low power consumption, and an excellent color reproduction rate, have been in the spotlight. The display device has been used for various electronic products such as a television, a monitor for a computer, a notebook computer, a mobile phone, a display unit of a refrigerator, a personal digital assistant, and an automated teller machine. In general, the display device interfaces with various input devices such as a keyboard, a mouse, and a digitizer. However, when a separate input device such as a keyboard, a mouse a digitizer is used, a user is required to know how to use the separate input device and since the separate input device occupies space, use of the display device is inconvenient in view of customer satisfaction. Therefore, a request for a convenient and simple input device that can reduce an erroneous operation gradually increases. According to such request a touch screen panel in which a user can input information by directly contacting with a screen by a finger or a pen is suggested.

Because the touch screen panel has a simple configuration while occurring little or no erroneous operations, can perform an input action without a separate input device, and has convenience in which the user can quickly and easily manipulate through contents displayed on a screen, the touch screen panel is applied to various display devices.

Touch screen panels are classified into a resistive type, a capacitive type, an electromagnetic type and so on according to a detection method of a touched portion. The resistive type touch screen panel determines a touched position by a voltage gradient according to resistance in a state that a DC voltage is applied to metal electrodes formed on an upper plate or a low plate. The capacitive type touch screen panel senses a touched position according to a difference in capacitance created in an upper or lower plate when the user physically is contacted with a conductive film formed on the upper or lower plate. The electromagnetic type touch screen panel detects a touched portion by reading an LC value induced as an electromagnetic pen touches a conductive film.

Figure 1:
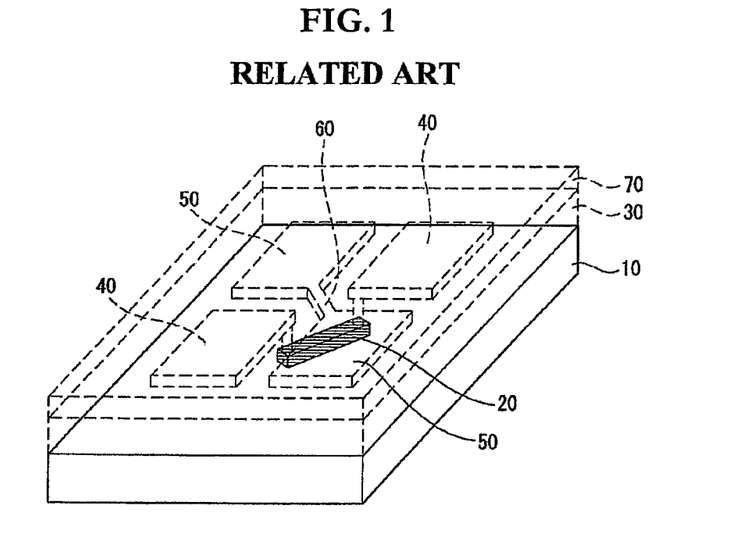
FIG. 1 is a perspective view illustrating a portion of a related art capacitive type touch screen panel.

Hereinafter, a related art capacitive type touch screen panel will be described with reference to FIGS. 1 and 2. FIG. 1 is a perspective view illustrating one portion of a related art capacitive type touch screen panel, and FIG. 2 is a cross-sectional view illustrating the touch screen panel of FIG. 1.

Figure 2:
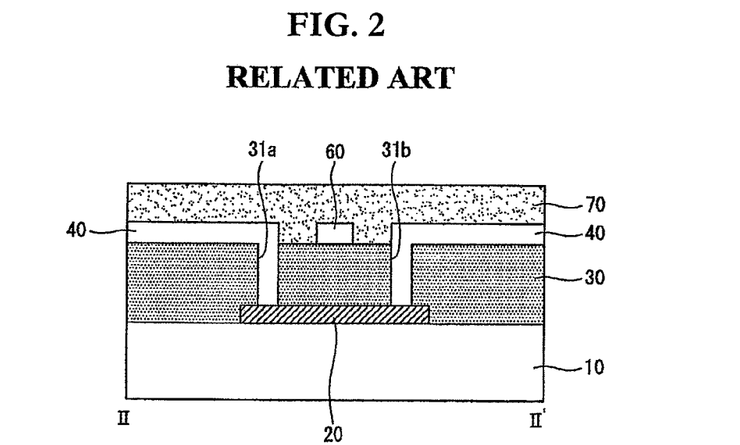
FIG. 2 is a cross-sectional view illustrating a portion of the touch screen panel shown in FIG. 1.

Referring to FIGS. 1 and 2, the related art capacitive type touch screen panel includes a substrate 10, a first electrode serial and a second electrode serial. The first electrode serial includes a plurality of first electrode patterns 40 and a first connection pattern 20 connecting the first electrode patterns 40 to each other. The second electrode serial includes a plurality of second electrode patterns 50 and a second connection pattern 60 connecting the second electrode patterns 50 to each other. The first electrode serial is intersected with the second electrode serial without contacting each other.

In the capacitive type touch screen panel, the first connection pattern 20 is formed on the substrate 10. A first insulation layer 30 is formed on an entire surface of the substrate 10 on which the first connection pattern 20 is formed. The first insulation layer 30 has two contact holes 31a and 31b exposing portions of the first connection pattern 20. On the first insulation layer 30, the first electrode patterns 40 of the first electrode serial and the second electrode patterns 50 and the second connection pattern 60 of the second electrode serial are formed. A second insulation layer 70 is formed on an entire surface of the first insulation layer 30 on which the first electrode patterns 40, the second electrode patterns 50 and the second connection pattern 60 are formed. The second insulation layer 70 functions as a passivation layer. The first electrode patterns 40 are connected to each other by the first connection pattern 20 formed between the substrate 10 and the first insulation layer 30 through the first and second contact holes 31a and 31b formed in the first insulation layer 30.

In the capacitive type touch screen panel, the first electrode patterns 40 and the first connection pattern 20 of the first electrode serial and the second electrode patterns and the second connection pattern 60 of the second electrode serial are made of transparent conductive material such as ITO (indium tin oxide). And also, the first and second insulation layers 30 and 70 are made of silicon nitride, silicon oxide or organic resin.

As above-mentioned, in the capacitive type touch screen panel, the first electrode patterns 40 are connected to each other by the first connection pattern 20 through the first and second contact holes 31a and 31b.

However, a diameter of the contact holes 31a and 31b of the capacitive type touch screen panel is very small since the first and the second electrode patterns 40 and 50 are made also small in order to enhance a touch precision. Because a resistance of a substance is inversely proportional to a cross-sectional area thereof, the resistance of the conductive material filled with the contact holes 31a and 31b are very high. Accordingly, if an electrostatic electricity is generated during a process of manufacturing the capacitive type touch screen panel, a very high current abruptly flows into the conductive material filled in the contact holes 31a and 31b having very high resistance, thereby damaging the contact holes 31a and 31b or the first connection pattern 20 contacted with the conductive material filled in the contact holes 31a and 31b.

Also, in the capacitive type touch screen panel, parts of the first electrode pattern 40 and the second connection pattern 60 overlapped with the first connection pattern 20 are protruded upward due to a step difference by the first connection pattern 20 formed between the substrate 10 and the insulation layer 30. Accordingly, if an electrostatic electricity is generated during a process of manufacturing the capacitive type touch screen panel, a very high current flows along surfaces of the first and second electrode patterns 40 and 50 and the second connection pattern 60, thereby converging into the protruded parts of the first electrode pattern 40 and the second connection pattern 50. In particular, a strong electric field is formed between the protruded part of the first electrode pattern 40 and the protruded part of the second connection pattern 60 because the first electrode pattern 40 is adjacent to the second connection pattern 60. Accordingly, the protruded parts of the first electrode pattern 40 and the second connection pattern 60 are damaged by the strong electric field.

SUMMARY OF THE INVENTION

An object of this invention is to provide a capacitive type touch screen panel that can prevent or reduce a damage of the touch screen panel caused by electrostatic electricity generated during a process of manufacturing the touch screen panel.

Additional features and advantages of this invention will be set forth in the description which follows, and in part will be apparent from the description, or may be learned by practice of this invention. The objectives and other advantages of this invention will be realized and attained by the structure particularly pointed out in the written description and claims thereof as well as the appended drawings.

To achieve these and other advantages and in accordance with the purpose of this invention, as embodied and broadly described, a touch screen panel includes a substrate; a plurality of first electrode serials formed on the substrate and arranged in a first direction; a plurality of second electrode serials on the same layer as the plurality of first electrode serials and arranged in a second direction which intersects the first direction; an insulation layer formed between the substrate and the pluralities of first and second electrode serials, and including at least two first contact holes and at least two second contact holes; and a plurality of first connection patterns formed between the substrate and the insulation layer and arranged separated from each other; wherein each of the plurality of first electrode serials includes a plurality of first electrode patterns which are separated from each other, at least one of the plurality of first connection patterns includes a first portion exposed through the at least two first contact holes and a second portion exposed through the at least two second contact holes, and an adjacent pair of the plurality of first electrode patterns in the first direction is connected to the first portion of the first connection pattern through the at least two first contact holes, and connected to the second portion of the first connection pattern through the at least two second contact holes.

Additionally, a touch screen panel includes a substrate; a series of a plurality of first electrodes formed on the substrate and arranged in a first direction; a series of a plurality of second electrodes formed on the same plane as the series of a plurality of first electrodes, and arranged in a second direction which intersects the first direction; an insulation layer formed between the substrate and the series of pluralities of first and second electrodes, and including at least two first contact holes and at least two second contact holes; and a plurality of first connection patterns formed between the substrate and the insulation layer, and arranged separated from each other in the first direction, wherein each of the series of plurality of first electrodes includes a plurality of first electrode patterns which are separated from each other, at least one of the plurality of first connection patterns includes a first portion exposed through the at least two first contact holes and a second portion exposed through the at least two second contact holes, and one of the plurality of first electrode patterns is connected to the first portion of the at least one of the plurality of first connection patterns through the at least two first contact holes, and another of the plurality of first electrode patterns is connected to the second portion of the at least one of the plurality of first connection patterns through the at least two second contact holes.

BRIEF DESCRIPTION OF THE DRAWINGS

The accompanying drawings, which are comprised to provide a further understanding of this invention and are incorporated in and constitute a part of this specification, illustrate implementations of this invention and together with the description serve to explain the principles of this invention. In the drawings.

DETAILED DESCRIPTION OF THE EMBODIMENTS

Embodiments of this invention are started from recognition that particular parts such as contact holes, electrode patterns and connection patterns of a touch screen panel.

Inventors studied damage phenomenon of the touch screen panel caused by an electrostatic electricity based on the recognition. As a result of the study, inventors obtained solutions as follows:

Firstly, it is possible to reduce damage of the contact holes and the connection patterns caused by the electrostatic electricity by increasing the number of contact holes which are formed in an insulation layer. If the number of the contact holes is increased, a total cross-sectional area of the electrode patterns filled into the contact holes is increased. Accordingly, total resistance of the electrode pattern itself is decreased, and the contact resistance generated when the electrode pattern is contacted with the connection pattern is also decreased because of an effect of parallel connection between electrode patterns filled into the contact holes. Therefore, it is possible to raise a critical breakdown voltage of the contact hole by decreasing the total resistance of the electrode patterns filled into the contact holes.

Secondly, it is possible to reduce damage of the contact holes and the connection patterns caused by the electrostatic electricity by using a material having a low resistivity, a material having a low contact resistance, or multi-layer structural metal layer as the first connection pattern for connecting the first electrode patterns to each other. If the material having a low resistivity is used as the first connection pattern, the total resistance of the first connection pattern is decreased. If the material having a low contact resistance is used as the first connection pattern, the contact resistance generated when the electrode pattern is contacted with the connection pattern is decreased. If the multi-layer structural metal layer is used as the first connection pattern, total resistance of the first electrode pattern and the first connection pattern is decreased. Accordingly, it is possible to raise a critical breakdown voltage of the first connection pattern by decreasing the total resistance of the first connection pattern.

Thirdly, it is possible to assure normal operation of the touch screen panel by using at least two first connection patterns for connecting the first electrode patterns to each other. This is because although when one first connection pattern or one of the contact holes is damaged, the other is normally maintained. Also, a load applied to each of the first connection patterns is reduced by about half because the first connection patterns are connected in parallel.

Lastly, it is possible to reduce damage of a first electrode pattern and a second connection pattern caused by electrostatic electricity by increasing a distance between specific parts of the first electrode pattern and the second connection pattern which are easily weakened by the electrostatic electricity. This is because it is possible to reduce an electric field generated between the specific parts caused by the electrostatic electricity, by sufficiently maintaining the distance between the specific parts of the first electrode pattern and the second connection pattern.

Hereinafter, example embodiments of this invention will be described in detail with reference to FIGS. 3 to 6C. Like reference numerals designate like elements throughout the specification.

Figure 3:
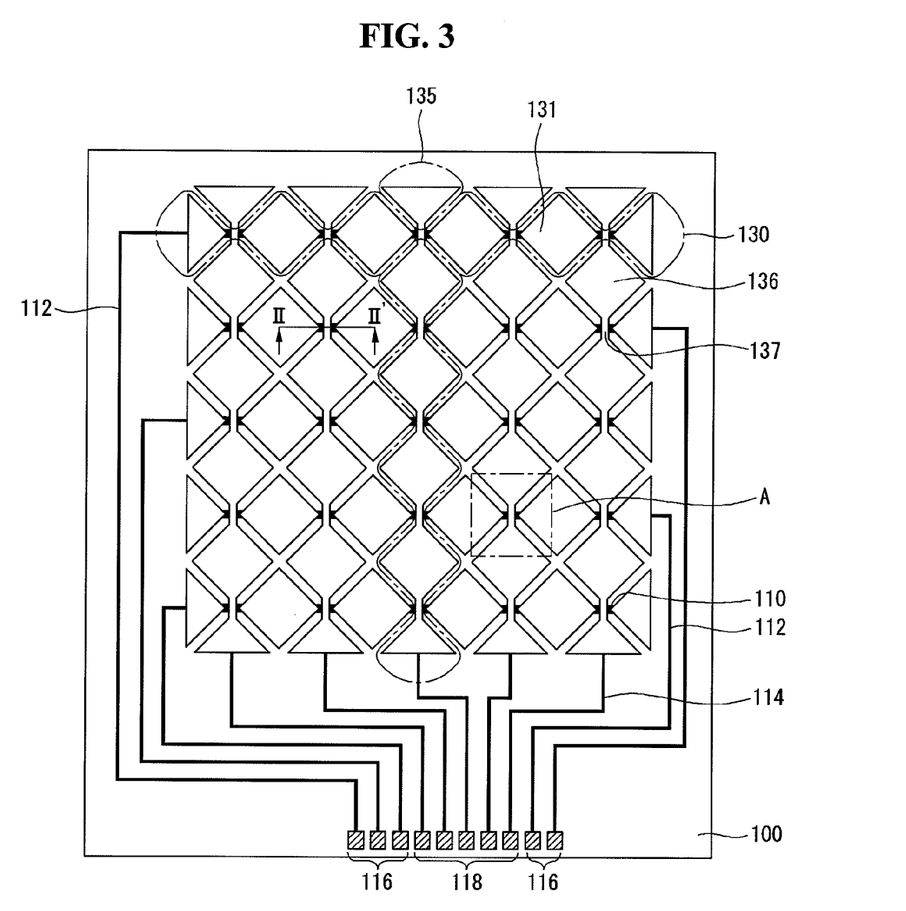
FIG. 3 is a plan view illustrating a touch screen panel according to embodiment of this invention.
Figure 4A:
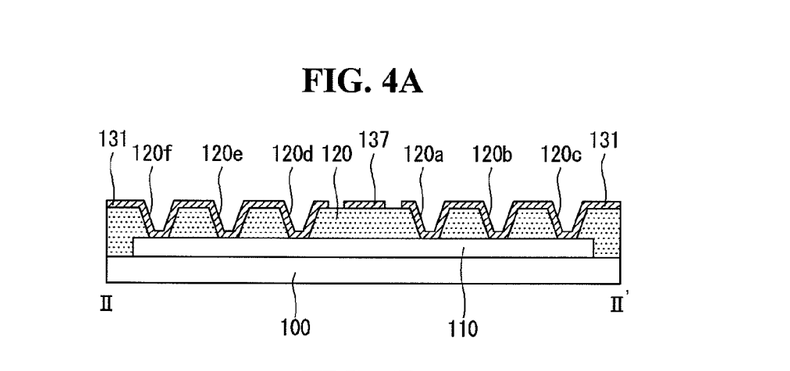
FIG. 4A is a cross-sectional view illustrating one example of the touch screen panel taken along line II-II' of FIG. 3.

FIG. 3 is a plan view illustrating a touch screen panel according to an example embodiment of this invention, FIG. 4A is a cross-sectional view illustrating one example of the touch screen panel taken along line II-II' of FIG. 3, and FIGS. 4B to 4D are enlarged plan views illustrating "A" area of the touch screen panel shown in FIG. 3, and showing various examples of a first electrode pattern and contact holes Referring to FIG. 3, a capacitive type touch screen panel according to an example embodiment of this invention includes a substrate 100, a plurality of first electrode serials 130, a plurality of second electrode serials 135, a plurality of first routing wires 112, a plurality of second routing wires 114, a plurality of first pads 116, and a plurality of second pads 118.

The plurality of first electrode serials 130 are arranged in parallel in a first direction (for example, an X-axis direction). Each of plurality of first electrode serials 130 includes first electrode patterns 131 having a triangle, a quadrangle, a diamond shape and so on, and first connection patterns 110 for connecting neighboring first electrode patterns 131.

The plurality of second electrode serial 135 are arranged in parallel in a second direction (for example, a Y-axis direction) to intersect the first electrode serials 130 without contacting each other. Each of the plurality of second electrode serials 135 includes second electrode patterns 136 having a triangle, a quadrangle, a diamond shape and so on similar to the first electrode patterns 131 and second connection patterns 137 for connecting neighboring second electrode patterns 136.

The plurality of first routing wires 112 are formed on the substrate 100 and connected to the plurality of first electrode serials 130, respectively. The plurality of second routing wires 114 are formed on the substrate 100 and connected to the plurality of second electrode serials 135, respectively.

The plurality of first pads 116 are connected to the plurality of first electrode serials 130 through the plurality of first routing wires 112, respectively, and the plurality of second pads 118 are connected to the plurality of second electrode serials 135 through the plurality of second routing wires 114, respectively.

Figure 4B:
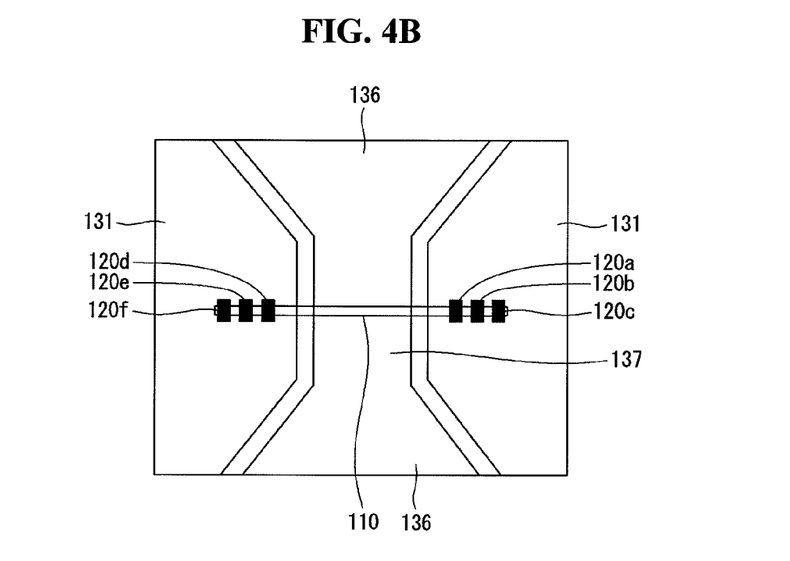
FIGS. 4B to 4D are enlarged plan views illustrating "A" area of the touch screen panel shown in FIG. 3, and showing various examples of a first connection pattern and contact holes.

Referring to FIGS. 4A and 4B, an insulation layer 120 is formed on an entire surface of the substrate 100 on which the first connection patterns 110, and the first and second routing wires 112 and 114 are formed. The insulation layer 120 includes a plurality of first contact holes 120a, 120b and 120c exposing a first portion of the first connection pattern 110 and a plurality of second contact holes 120d, 120e and 120f exposing a second portion of the first connection pattern 110. In the example embodiment of this invention, the number of the first or second contact holes is three, but is not limited thereto. It is possible to set the number of the first or second contact holes to two or more according to the size or position of the first and second electrode patterns or the contact holes.

The first connection pattern 110 is separated from the first electrode pattern 131, and the second connection pattern 137 is integrally formed with the second electrode pattern 136. On the contrary, the first connection pattern may be integrally formed with the first electrode pattern, and the second connection pattern may be formed on the substrate and the insulation layer and separated from the second electrode pattern in other embodiments. In this instance, the second electrode patterns may be connected to each other by the second connection pattern through the contact holes.

Figure 4C:
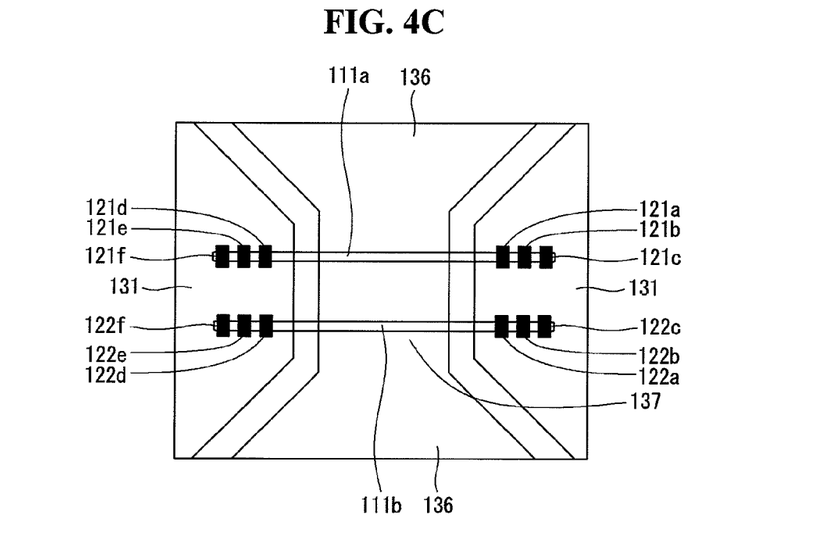

FIG. 4C is an plan view illustrating the touch screen panel in which the first electrode patterns 131 are connected to each other by two first connection patterns 111a and 111b. In the touch screen panel of the FIG. 4C, the first connection patterns 111a connects the neighboring first electrode patterns 131 via first contact holes 121a, 121b, 121c, 121d, 121e and 121f, and also the second connection patterns 111b connects the neighboring first electrode patterns 131 via second contact holes 122a, 122b, 122c, 122d, 122e and 122f. Accordingly, it is possible to reduce a load applied to each of the two first connection patterns 111a and 111b by electrostatic electricity by about half. Also, although when any one first connection pattern of the two first connection patterns 111a and 111b is damaged, the other one first connection pattern can be normally maintained. Accordingly, it is possible for the touch screen panel to be normally operated.

A material of the first connection pattern 110 may be a transparent conductive material such as indium tin oxide (ITO), indium zinc oxide (IZO) and so on, Cu, Mo, or Al/Ni alloy. It is preferable, but not required, to use Cu because the resistivity of Cu is very low and cost thereof is also low. It is more preferable, but not required, to use Mo or Al/Ni alloy because they have a very low contact resistance when they are contacted with ITO or IZO used as the first electrode pattern 131. A material of the insulation layer 120 may be silicon nitride, silicon oxide, organic material and so on.

In the touch screen panels of FIGS. 4B and 4C, the first connection patterns 110, 111a and 111b are formed in a straight line, but are not limited thereto. The first connection patterns 110, 111a and 111b may have a middle part, and first and second parts respectively extended from both ends of the middle part and formed in a predetermined angle to the middle part. Also, at least one of the contact holes may have a size different from that of the other contact holes.

Figure 4D:
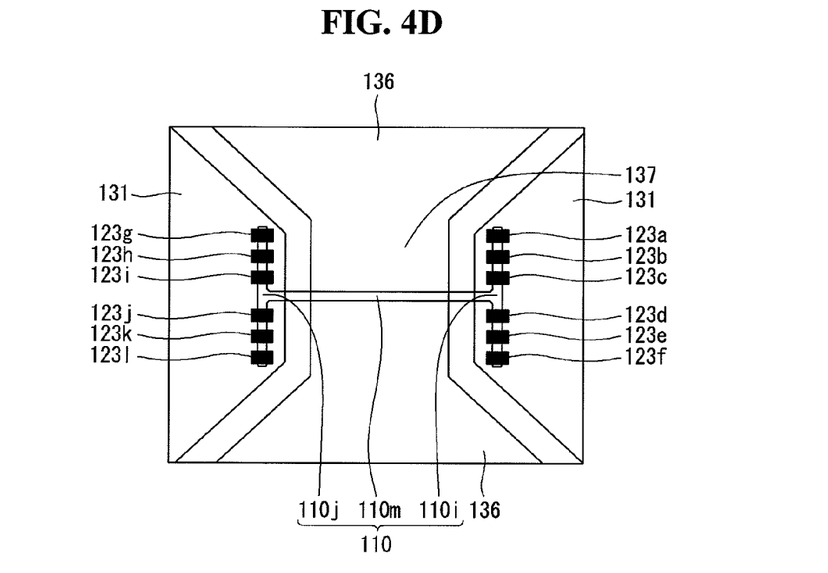

FIG. 4D is a plan view illustrating the touch screen panel in which the first and second parts are formed to be intersected in perpendicular to the middle part of first connection pattern.

Referring to FIG. 4D, the first connection pattern 110 has a middle part 110m, a first part 110i and a second part 110j extended from both ends of the middle part 110m. The first part 110i is exposed through first to sixth contact holes 123a, 123b, 123c, 123d, 123e and 123f, and the second part 110j is exposed through seventh to twelfth contact holes 123g, 123h, 123i, 123j, 123k and 123l. In the touch screen panel of FIG. 4D, the first part 110i and the second part 110j are formed to be intersected in perpendicular to the middle part 110m, but are not limited thereto. The first part 110i and the second part 110j may be formed to be intersected in a predetermined angle to the middle part 110m.

According to the above-mentioned example embodiment of this invention, the total resistance of the first electrode pattern is decreased because the first connection pattern is connected with the first electrode patterns through the plurality of contact holes for increasing a cross sectional area of the first electrode pattern filled in the contact holes. Accordingly, it is possible to reduce or prevent damage of the contact holes and the first connection patterns caused by the electrostatic electricity by increasing the number of contact holes which are formed in the insulation layer.

Figure 5:
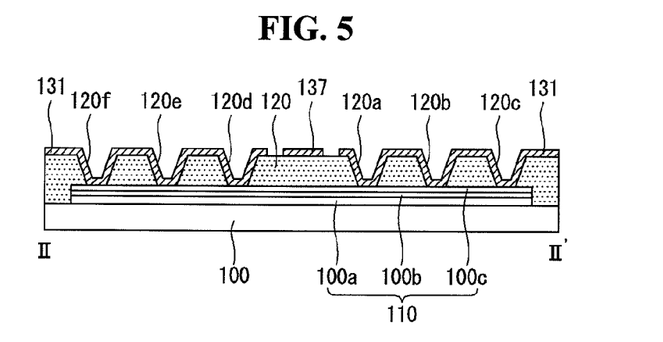
FIG. 5 is a cross-sectional view illustrating another example of the touch screen panel taken along line II-II' of FIG. 3.

Another example embodiment of this invention will be described in detail with reference to FIG. 5. FIG. 5 is a cross-sectional view illustrating another example of the touch screen panel taken along line II-II' of FIG. 3.

Elements of the touch screen panel shown in FIG. 5 is the same as those of FIG. 4A excepting the first connection pattern. Accordingly, like reference numerals designate like elements, and detailed description thereto will be omitted for the sake of simplicity of specification.

Referring to FIG. 5, the first connection pattern 110 includes a first metal layer 110a, a second metal layer 110b and a third metal layer 110c sequentially formed on the substrate 100. It is preferable, but not required, to use aluminum or an aluminum alloy such as AlNd as a material of the first metal layer 110a because resistivity of aluminum or the aluminum alloy is low. It is preferable, but not required, to use molybdenum (Mo) or a molybdenum alloy as a material of the second metal layer 110b because the contact resistance of Mo or the molybdenum alloy is very low when Mo is contacted with the first electrode pattern 131 such as a transparent electrode. Examples of transparent electrode include ITO or IZO. Also, it is preferable, but not required, to use the same as the material (for example, ITO or IZO) of the first electrode pattern 131 as a material of the third metal layer 110c. Additionally, the material of the first metal layer 110a and the material of the second metal layer 110b may be any one of Al, Nd, AlNd, Mo, Ti, MoTi, Cu, Cr, or alloys thereof. Other metals, alloys, or materials are also usable.

According to the touch screen panel shown in FIG. 5, it is possible to decrease the total resistance of the first connection pattern 110 having a multi-layer structure because the second metal layer 110b is connected with the third metal layer 110c in parallel. Also, the Mo layer as the second metal layer 110b disposed between the substrate 100 and the insulation layer 120 may be etched by an etchant when the contact holes are formed in the insulation layer 120 because hardness of Mo is very low. However, in the touch screen panel of FIG. 5, the Mo layer is not etched because third metal layer 110c is formed on the Mo layer used as the second metal layer 110b and the hardness of ITO or IZO used as the third metal layer 110c is high. Accordingly, it is possible to prevent or reduce the first connection pattern 110 from being damaged by electrostatic electricity because the total resistance of the connection pattern 110 is decreased. In the touch screen panel shown in FIG. 5, the first connection pattern 110 consists of three layers but is not limited thereto. It is possible to set the layer number of the first connection pattern 110 to two or more layers according to physical characteristics of material used as the first connection pattern 110.

Figure 6A:
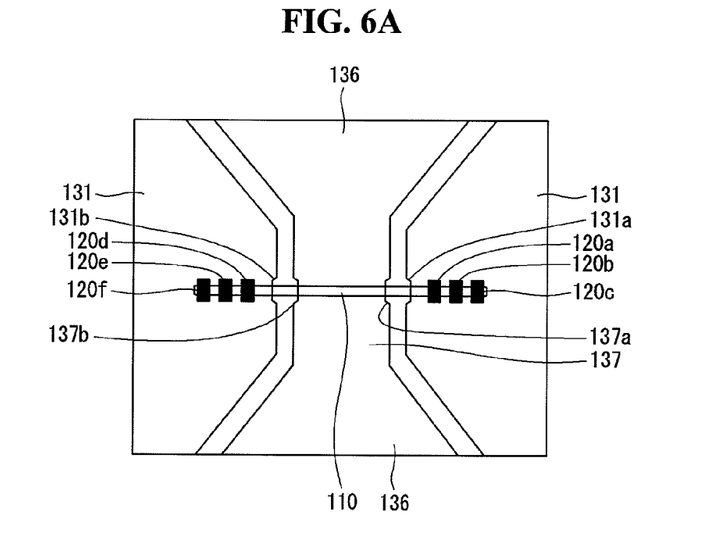
FIGS. 6A to 6C are enlarged plan views illustrating "A" area of the touch screen panel shown in FIG. 3, and showing variation examples of a first electrode pattern, first and second connection patterns, and contact holes.
Figure 6B:
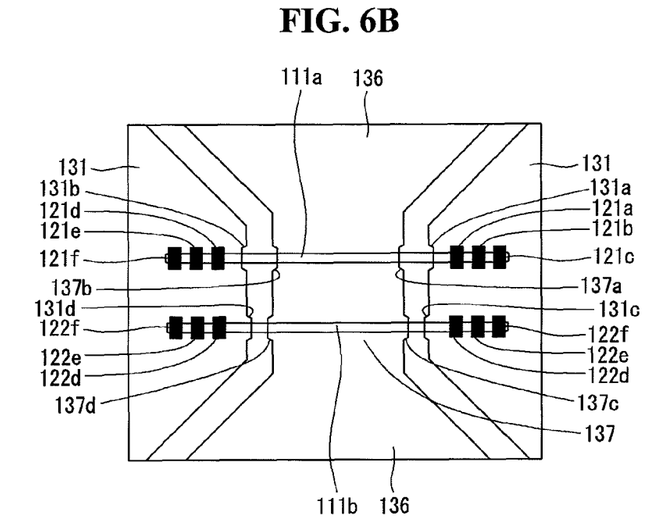
Figure 6C:
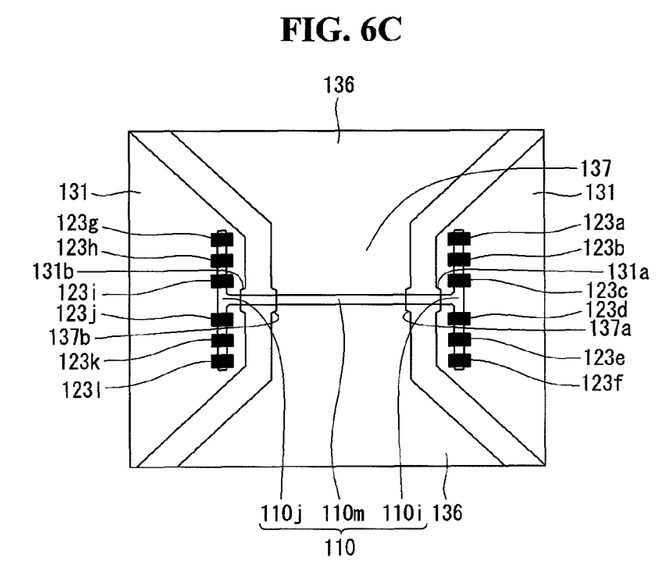

Hereinafter, other example embodiments of this invention will be described in detail with reference to FIGS. 6A to 6C. FIGS. 6A to 6C are plan views illustrating variation examples of a first electrode pattern, a second connection pattern, and contact holes.

Elements of the touch screen panels shown in FIGS. 6A to 6C are the same as those of FIGS. 3 to 5 excepting the first electrode pattern and the first connection pattern. Accordingly, like reference numerals designate like elements, and detailed description thereto will be omitted for the sake of simplicity of specification.

Referring to FIG. 6A, the first electrode pattern 131 of the touch screen panel includes a first concave part 131a and a second concave part 131b formed at both ends of a part overlapping with the first connection pattern 110. The second connection pattern 137 includes a third and a fourth concave parts 137a and 137b formed at both ends of a part overlapping with the first connection pattern 110. The third concave part 137a is opposite to the first concave part 131a, and the fourth concave part 137b is opposite to the second concave part 131b. The parts of the first electrode pattern 131 and the second connection pattern 137 overlapped with the first connection pattern 110 are protruded upward due to a step difference by the first connection pattern 110 formed between the substrate 100 and the insulation layer 120.

According to the example embodiment of the touch screen panel shown in FIG. 6A, the distance between the protruded part of first electrode pattern 131 and the protruded part of second connection pattern 137 is lengthened by the first concave part 131a and the third concave 137a and/or the second concave part 131b and the fourth concave 137b. Accordingly, although electrostatic electricity is generated during a process of manufacturing the touch screen panel, only a weak electric field is formed between the protruded parts of the first electrode pattern 131 and the second connection pattern 137. Thus it is possible to prevent or reduce the first electrode pattern 131 and the second connection pattern 137 from being damaged.

Referring to FIG. 6B, the first electrode pattern 131 of the touch screen panel includes two first connection pattern 111a and 111b for connecting one first electrode pattern 131 with another first electrode pattern 131 neighboring thereto. The parts of the first electrode pattern 131 and the second connection pattern 137 overlapped with the first connection patterns 111a and 111b are protruded upward due to a step difference by the first connection patterns 111a and 111b formed between the substrate 100 and the insulation layer 120. In the touch screen panel of FIG. 6B, the number of the first connection pattern is two, but is not limited thereto. It is possible to set the number of the first connection pattern to two or more.

The first electrode pattern 131 includes a first concave part 131a and a second concave part 131b formed at both ends of a part overlapping with the first connection pattern 111a. Also, the first electrode pattern 131 a first convex part 131c and a second convex part 131d formed at both ends of a part overlapping with the first connection pattern 111b.

The second connection pattern 137 includes a third and a fourth concave parts 137a and 137b formed at both ends of a part overlapping with the first connection pattern 111a. The third concave part 137a is opposite to the first concave part 131a, and the fourth convex part 137b is opposite to the second concave part 131b. Also, the second connection pattern 137 includes a third and a fourth convex parts 137c and 137d formed at both ends of a part overlapping with the first connection pattern 111b. The third convex part 137c is opposite to the first convex part 131c, and the fourth convex part 137d is opposite to the second convex part 131d.

According to the touch screen panel shown in FIG. 6B, at position which the first electrode pattern 131 and the second connection pattern 137 are overlapped with the first connection pattern 111a, the distance between the protruded part of first electrode pattern 131 and the protruded part of second connection pattern 137 is lengthened by the first concave part 131a and the third concave 137a and/or the second concave part 131b and the fourth concave 137b. Accordingly, although electrostatic electricity is generated during a process of manufacturing the touch screen panel, only a weak electric field is formed between the protruded parts of the first electrode pattern 131 and the second connection pattern 137.

Thus it is possible to prevent or reduce the first electrode pattern 131 and the second connection pattern 137 from being damaged.

On the contrary, at positions which the first electrode pattern 131 and the second connection pattern 13 are overlapped with the first connection pattern 111b, the distance between the protruded part of first electrode pattern 131 and the protruded part of second connection pattern 137 is shortened by the first convex part 131c and the third convex part 137c and/or the second convex part 131d and the fourth convex part 137d. Accordingly, if an electrostatic electricity is generated during a process of manufacturing the touch screen panel, a strong electric field is formed between the protruded parts of the first electrode pattern 131 and the second connection pattern 137 at positions which the first electrode pattern 131 and the second connection pattern 137 are overlapped with the first connection pattern 111b.

Thus, although the protruded parts of the first electrode pattern 131 and the second connection pattern 137 may be damaged at positions which the strong electric field is generated, the protruded parts of the first electrode pattern 131 and the second connection pattern 137 are maintained at which the weak electric field is generated. As a result, it is possible to assure normal operation of the touch screen panel.

Referring to FIG. 6C, the first electrode pattern 131 of the touch screen panel includes a first concave part 131a and a second concave part 131b formed at both ends of a part overlapping with the first connection pattern 110. The second connection pattern 137 includes a third and a fourth concave parts 137a and 137b formed at both ends of a part overlapping with the first connection pattern 110. The third concave part 137a is opposite to the first concave part 131a, and the fourth convex part 137b is opposite to the second concave part 131b. Herein, the parts of the first electrode pattern 131 and the second connection pattern 137 overlapped with the first connection pattern 110 are protruded upward due to a step difference by the first connection pattern 110 formed between the substrate 100 and the insulation layer 120.

The first connection pattern 110 of the touch screen panel shown in FIG. 6C has a middle part 110m, a first part 110i and a second part 110j extended from both ends of the middle part 110m similar to that of the touch screen panel shown in FIG. 4D. The insulation layer 120 of the touch screen panel shown in FIG. 6C includes first to sixth contact holes 123a, 123b, 123c, 123d, 123e and 123f to expose the first part 110i, and seventh to twelfth contact holes 123g, 123h, 123i, 123j, 123k and 123l to expose the second part 110j. In the touch screen panel of FIG. 6C, the number of the contact holes is set to twelve and the first part 110i and the second part 110j are formed to be intersected in perpendicular to the middle part 110m, but are not limited thereto. The number of the contact holes may be appropriately adjusted. And also, the first part 110i and the second part 110j may be formed to be in a straight line or intersected in a predetermined angle to the middle part 110m.

According to the touch screen panel shown in FIG. 6C, the distance between the protruded part of first electrode pattern 131 and the protruded part of second connection pattern 137 is lengthened by the first concave part 131a and the third concave 137a and/or the second concave part 131b and the fourth concave 137b. Accordingly, although electrostatic electricity is generated during a process of manufacturing the touch screen panel, only a weak electric field is formed between the protruded parts of the first electrode pattern 131 and the second connection pattern 137. Thus it is possible to prevent or reduce the first electrode pattern 131 and the second connection pattern 137 from being damaged.

Table 1 shows results of electrostatic discharge (ESD) test for a comparative example of the touch screen panel according to the related art and examples 1 to 3 according to the example embodiments of this invention. In the test, inventors apply electrostatic electricity to a portion of touch screen panel using an ESD gun in air while gradually increasing the voltage level, and then measures breakdown voltages whenever the touch screen panels are damaged.

TABLE 1

|  | Before attaching Polarizer | After attaching Polarizer |
| --- | --- | --- |
| Comparative example | 2 kV | 13 kV |
| Example 1 | 6 kV | 23 kV |
| Example 2 | 8 kV | 23 kV |
| Example 3 | 7 kV | 20 kV |

In table 1, comparative example designates the relate art touch screen panel shown in FIG. 1, example 1 designates the touch screen panel shown in FIG. 6A, example 2 designates the touch screen panel shown in FIG. 6B, and example 3 designates the touch screen panel shown in FIG. 6C.

As shown in table 1, critical breakdown voltages of the touch screen panels according to the example embodiment of this invention are increased to three or four times before attaching a polarizer thereto, and 1.54 to 1.7 times after attaching a polarize thereto compared to the comparative example according to the related art. Accordingly, it is possible to effectively prevent or reduce the touch screen panel from being damaged by electrostatic electricity.

The touch screen panels according to the example embodiments of this invention may be applied to display devices such as a liquid crystal display, a field emission display, a plasma display panel, an electroluminescence device, an electrophoresis display and a flexible display. In these cases, the substrates of the touch screen panels may be also used as substrates of the display devices.

Although example embodiments have been described with reference to a number of illustrative examples, it should be understood that numerous other modifications and changes can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A touch screen panel, comprising:
   a substrate;
   a plurality of first electrode serials formed on the substrate and arranged in a first direction;
   a plurality of second electrode serials on the same layer as the plurality of first electrode serials and arranged in a second direction which intersects the first direction;
   an insulation layer formed between the substrate and the pluralities of first and second electrode serials, and including at least two first contact holes and at least two second contact holes; and
   a plurality of first connection patterns formed between the substrate and the insulation layer and arranged separated from each other;

wherein each of the plurality of first electrode serials includes a plurality of first electrode patterns which are separated from each other, each of the plurality of first connection patterns includes a first portion exposed through the at least two first contact holes and a second portion exposed through the at least two second contact holes, and one electrode pattern of the plurality of first electrode patterns is connected to the first portion of the first connection patterns exposed through the at least two first contact holes, and another electrode pattern of the plurality of first electrode patterns adjacent to the one electrode pattern in the first direction is connected to the second portion of the first connection patterns through the at least two second contact holes.

2. The touch screen panel of claim 1, wherein the at least two first contact holes, and the at least two second contact holes reduces or prevents damage to the touch screen panel caused by electrostatic electricity.

3. The touch screen panel of claim 1, wherein each of the plurality of second electrode serials comprises a plurality of second electrode patterns and a plurality of second connection patterns, each of the plurality of second connection patterns connecting adjacent pairs of the plurality of second electrode patterns.

4. The touch screen panel of claim 3, wherein the plurality of second connection patterns is on the same layer as the plurality of first electrode serials and the plurality of second electrode serials.

5. The touch screen panel of claim 1, wherein each adjacent pairs of the plurality of first electrode patterns are connected via at least two of the plurality of first connection patterns.

6. The touch screen panel of claim 1, wherein the at least two first contact holes and the at least two second contact holes are arranged in the first direction.

7. The touch screen panel of claim 1, wherein the at least two first contact holes and the at least two second contact holes are arranged in the second direction.

8. The touch screen panel of claim 1, wherein the at least one of the plurality of first connection patterns is straight.

9. The touch screen panel of claim 1, wherein the at least one of the plurality of first connection patterns includes a first part, a second part, and a middle part to connect the first and second parts, the first and second parts extending in the second direction, and the middle part extending in the first direction.

10. The touch screen panel of claim 1, wherein the at least one of the plurality of first connection patterns includes a first part, a second part, and a middle part to connect the first and second parts, the first and second parts extending at an angle to the first direction, and the middle part extending in the first direction.

11. The touch screen panel of claim 1, wherein the at least one of the plurality of first connection patterns is formed of a transparent conductive material or a metallic material.

12. The touch screen panel of claim 11, wherein the transparent conductive material includes indium tin oxide (ITO) or indium zinc oxide (IZO).

13. The touch screen panel of claim 11, wherein the metallic material includes one of Cu, Mo, and Al/Ni alloy.

14. The touch screen panel of claim 1, wherein the each of the plurality of first connection patterns includes a plurality of layers.

15. The touch screen panel of claim 14, wherein the plurality of layers includes a first metal layer, a second metal layer, and a third layer, and materials forming the first metal layer, the second metal layer and the third layer are different.

16. The touch screen panel of claim 1, wherein each adjacent pairs of the plurality of first electrode patterns includes a pair of concave parts overlapping with one of the plurality of first connection patterns that connects the each adjacent pairs of the plurality of first electrode patterns.

17. The touch screen panel of claim 1, wherein each adjacent pairs of the plurality of first electrode patterns includes a pair of convex parts overlapping with one of the plurality of first connection patterns that connects the each adjacent pairs of the plurality of first electrode patterns.

18. The touch screen panel of claim 1, wherein sizes of the at least two first contact holes and the at least two second contact holes are different.

19. A touch screen panel, comprising:
a substrate;
a series of a plurality of first electrodes formed on the substrate and arranged in a first direction;
a series of a plurality of second electrodes formed on the same plane as the series of a plurality of first electrodes, and arranged in a second direction which intersects the first direction;
an insulation layer formed between the substrate and the series of pluralities of first and second electrodes, and including at least two first contact holes and at least two second contact holes; and
a plurality of first connection patterns formed between the substrate and the insulation layer, and arranged separated from each other in the first direction,
wherein each of the series of plurality of first electrodes includes a plurality of first electrode patterns which are separated from each other,
each of the plurality of first connection patterns includes a first portion exposed through the at least two first contact holes and a second portion exposed through the at least two second contact holes, and
one electrode pattern of the plurality of first electrode patterns is connected to the first portion of the first connection patterns exposed through the at least two first contact holes, and another electrode pattern of the plurality of first electrode patterns adjacent to the one electrode pattern in the first direction is connected to the second portion of the first connection patterns through the at least two second contact holes.

* * * * *